(12) United States Patent
Cordova et al.

(10) Patent No.: US 11,297,177 B2
(45) Date of Patent: Apr. 5, 2022

(54) SYSTEMS AND METHODS FOR DETECTING AIRBAG DEPLOYMENT RESULTING FROM A VEHICLE CRASH

(71) Applicant: CAMBRIDGE MOBILE TELEMATICS INC., Cambridge, MA (US)

(72) Inventors: Brad Cordova, Cambridge, MA (US); Eddie Vaisman, Cambridge, MA (US); Yuting Qi, Lexington, MA (US); Sushrut Karnik, Cambridge, MA (US)

(73) Assignee: CAMBRIDGE MOBILE TELEMATICS INC., Cambridge, MA (US)

( * ) Notice: Subject to any disclaimer, the term of this patent is extended or adjusted under 35 U.S.C. 154(b) by 276 days.

(21) Appl. No.: 16/405,250

(22) Filed: May 7, 2019

(65) Prior Publication Data
US 2019/0349462 A1     Nov. 14, 2019

Related U.S. Application Data

(60) Provisional application No. 62/669,910, filed on May 10, 2018.

(51) Int. Cl.
*H04M 1/72421* (2021.01)
*B60R 21/015* (2006.01)
(Continued)

(52) U.S. Cl.
CPC ......... *H04M 1/72421* (2021.01); *B60K 28/14* (2013.01); *B60R 21/013* (2013.01);
(Continued)

(58) Field of Classification Search
CPC ......... H04M 1/72421; H04M 2250/12; H04M 2250/10; H04M 1/72412; B60R 21/013;
(Continued)

(56) References Cited

U.S. PATENT DOCUMENTS 7,181,192 B2 *   2/2007   Panasik ............ H04M 1/72421
                                                    455/404.1
9,449,495 B1    9/2016   Call et al.
(Continued)

OTHER PUBLICATIONS

GB1906633.1, "Search Report", dated Nov. 8, 2019, 3 pages.

*Primary Examiner* — Geepy Pe
*Assistant Examiner* — Daniel Tyler Reich
(74) *Attorney, Agent, or Firm* — Kilpatrick Townsend & Stockton LLP

(57) ABSTRACT

A method for detecting airbag deployment includes operating a plurality of sensors of the mobile device disposed in a vehicle during a drive to obtain a plurality of measurement signals, determining a change in at least one measurement signal of the plurality of measurement signals and that the change exceeds a first threshold. In response to determining that the change exceeds the first threshold, obtaining a pressure measurement signal from a pressure sensor of the plurality of sensors, determining a derivative of the pressure measurement signal, and determining that the derivative of the pressure measurement signal exceeds a second threshold. In response to determining that the derivative of the pressure measurement signal exceeds the second threshold, detecting a deployment of a vehicle airbag based on the change in the at least one measurement signal exceeding the first threshold and the derivative of the pressure measurement signal exceeding the second threshold.

20 Claims, 11 Drawing Sheets

(51) Int. Cl.
*B60K 28/14* (2006.01)
*B60R 21/013* (2006.01)
*B60R 21/00* (2006.01)
*B60R 21/01* (2006.01)

(52) U.S. Cl.
CPC ..... *B60R 21/01504* (2014.10); *B60R 2021/0027* (2013.01); *B60R 2021/01088* (2013.01); *H04M 2250/10* (2013.01); *H04M 2250/12* (2013.01)

(58) Field of Classification Search
CPC ...... B60R 21/01504; B60R 2021/0027; B60R 2021/01088; B60K 28/14; G01D 21/02; G08B 21/00
See application file for complete search history.

(56) References Cited

U.S. PATENT DOCUMENTS

| | | |
|---|---|---|
| 9,672,719 B1 | 6/2017 | Hollenstain et al. |
| 9,679,487 B1 | 6/2017 | Hayward |
| 9,786,154 B1* | 10/2017 | Potter ................ B60W 40/09 |
| 2012/0282885 A1 | 11/2012 | Hamed et al. |
| 2015/0145236 A1* | 5/2015 | Park ................ B60R 21/0136 280/735 |
| 2017/0279957 A1* | 9/2017 | Abramson et al. ..... G06F 21/36 |

* cited by examiner

SYSTEMS AND METHODS FOR DETECTING AIRBAG DEPLOYMENT RESULTING FROM A VEHICLE CRASH

CROSS-REFERENCE TO RELATED APPLICATIONS

This application claims the benefit of U.S. Provisional Application No. 62/669,910, filed May 10, 2018; the contents of each are hereby incorporated herein by reference in their entirety.

BACKGROUND OF THE INVENTION

Mobile devices, including smart phones, have been utilized to provide location information to users. Mobile devices can use a number of different techniques to produce location data. One example is the use of Global Positioning System (GPS) chipsets, which are now widely available, to produce location information for a mobile device. Mobile devices have an assortment of sensors available to detect various aspects of mobile device movement. Some conventional systems have been developed to track driving conditions including speed, braking, and turn speed. Such systems include external devices that have been physically integrated with vehicles to track driving behavior.

SUMMARY OF THE INVENTION

Despite the progress made in relation to collecting data related to drivers and their driving behavior, there is a need in the art for improved systems and methods related to predicting, detecting, and reconstructing vehicle accidents using a mobile device.

Embodiments of the present disclosure relate to transportation systems. More particularly, embodiments relate to methods and systems of vehicle data collection by a user having a mobile device. In a particular embodiment, vehicle data, such as vehicle movement data (also termed herein "driving data" or "data") is collected, analyzed and transformed, and combinations of collected data and transformed data are used in different ways, including, but not limited to detecting vehicle accidents.

According to various aspects, there is provided a method for detecting airbag deployment using a mobile device. In some aspects, the method may include: operating a plurality of sensors of the mobile device disposed in a vehicle during a drive to obtain a plurality of measurement signals; determining, by a processor of the mobile device, a change in at least one measurement signal of the plurality of measurement signals; and determining, by the processor of the mobile device, that the change in the at least one measurement signal exceeds a first threshold. In response to determining that the change in the at least one measurement signal exceeds the first threshold, the method may include obtaining a pressure measurement signal from a pressure sensor of the plurality of sensors of the mobile device; determining, by the processor of the mobile device, a derivative of the pressure measurement signal; and determining, by the processor of the mobile device, that the derivative of the pressure measurement signal exceeds a second threshold. In response to determining that the derivative of the pressure measurement signal exceeds the second threshold, the method may include detecting a deployment of a vehicle airbag based on the change in the at least one measurement signal exceeding the first threshold and the derivative of the pressure measurement signal exceeding the second threshold.

According to various aspects, there is provided a mobile device configured to detect airbag deployment, the mobile device. In some aspects, the mobile device may include a plurality of sensors; a memory configured to store instructions; and a processor configured to communicate with the plurality of sensors and the memory. The instructions may be operable to cause the processor to: operate the plurality of sensors of the mobile device disposed in a vehicle during a drive to obtain a plurality of measurement signals; determine a change in at least one measurement signal of the plurality of measurement signals; and determine that the change in the at least one measurement signal exceeds a first threshold. In response to determining that the change in the at least one measurement signal exceeds the first threshold, the instructions may be operable to cause the processor to: obtain a pressure measurement signal from a pressure sensor of the plurality of sensors; determine a derivative of the pressure measurement signal; and determine that the derivative of the pressure measurement signal exceeds a second threshold. In response to determining that the derivative of the pressure measurement signal exceeds the second threshold, the instructions may be operable to cause the processor to: detect a deployment of a vehicle airbag based on the change in the at least one measurement signal exceeding the first threshold and the derivative of the pressure measurement signal exceeding the second threshold.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments are described in detail below with reference to the following drawing figures.

Figure 1:
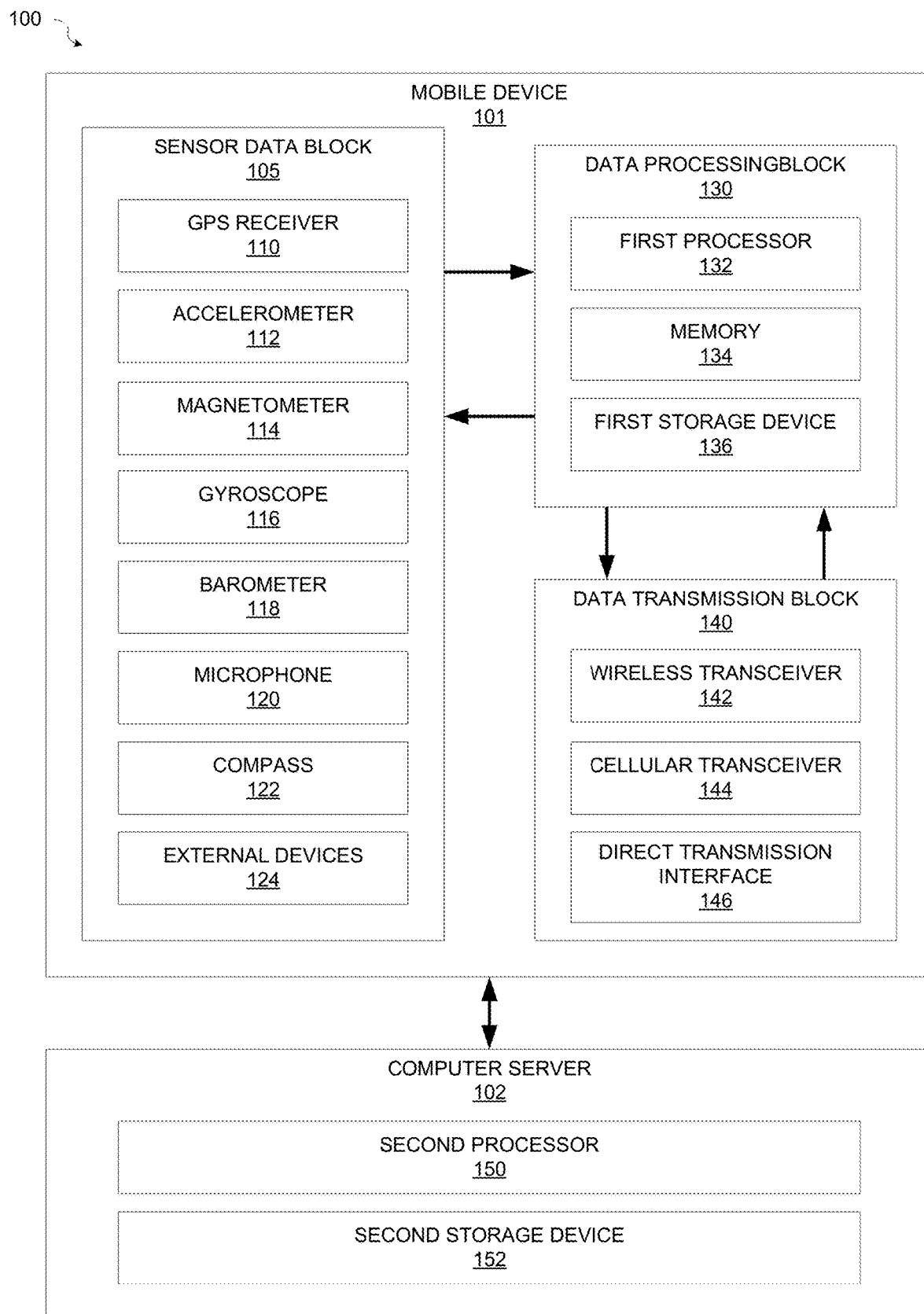
FIG. 1 is a block diagram illustrating a system for collecting and processing vehicle movement data using a mobile device according to various aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF SPECIFIC EMBODIMENTS

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of various embodiments. However, it will be apparent that the various embodiments may be practiced without these specific details. The figures and description are not intended to be restrictive.

The description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Various embodiments utilize mobile devices to provide information on a user's behaviors during transportation. For example, a mobile device carried by a user could be used to analyze driving behavior, which is of interest for a variety of applications.

As discussed below, some embodiments described herein use approaches to collecting and analyzing driving data similar to the approaches described in U.S. patent application Ser. No. 15/149,603, filed May 9, 2016, entitled "METHODS AND SYSTEMS FOR SENSOR-BASED VEHICLE ACCELERATION DETERMINATION," (the '603 Application), U.S. patent application Ser. No. 15/149,613, filed May 9, 2016, entitled "METHODS AND SYSTEMS FOR SENSOR-BASED DRIVING DATA COLLECTION" (the '613 Application), and U.S. patent application Ser. No. 14/749,232, filed Jun. 24, 2015, entitled "METHODS AND SYSTEMS FOR ALIGNING A MOBILE DEVICE TO A VEHICLE" (the '232 Application), U.S. patent application Ser. No. 15/249,967, filed Aug. 29, 2016, entitled "METHODS AND SYSTEMS FOR PRESENTING COLLECTED DRIVING DATA," (the '967 Application), U.S. patent application Ser. No. 15/268,049, filed Sep. 16, 2016, entitled "METHODS AND SYSTEMS FOR DETECTING AND ASSESSING DISTRACTED DRIVERS," (the '049 Application), U.S. patent application Ser. No. 15/353,340, filed Nov. 16, 2016, entitled "METHODS AND SYSTEMS FOR COMBINING SENSOR DATA TO MEASURE VEHICLE MOVEMENT," these applications being incorporated by reference herein in their entireties for all purposes ("the Incorporated Applications").

Specific examples of the use of different embodiments disclosed in the Incorporated Applications are provided herein, and it is contemplated that additional approaches described in these applications can be used by some embodiments described herein.

FIG. 1 is a block diagram illustrating a system 100 for collecting and processing vehicle movement data using a mobile device according to various aspects of the present disclosure. Some embodiments use vehicle movement data to detect the occurrence of events associated with the vehicle, e.g., an accident (also referred to herein as a "collision" or a "crash"). Referring to FIG. 1, the system 100 may include a mobile device 101 and a server 102. The mobile device 101 may include a sensor data block 105, a data processing block 120, and a data transmission block 130. The sensor data block 105 may include for example, but not limited to, a GPS receiver 110, an accelerometer 112, a magnetometer 114, a gyroscope 116, a barometer 118, a microphone 120 and a compass 122. The sensor block data block 105 may also interface with and receive data from external devices 124 connected via wireless connection such as Bluetooth®, USB cable, etc. Data collected from the sensors may be available to the mobile device 101. Some embodiments use vehicle movement data to detect the occurrence of events associated with the vehicle, e.g., an accident (also referred to herein as a "collision" or a "crash"). Referring to FIG. 1, the system 100 may include a mobile device 101 and a server 102. The mobile device 101 may include a sensor data block 105, a data processing block 120, and a data transmission block 130. The sensor data block 105 may include for example, but not limited to, a GPS receiver 110, an accelerometer 112, a magnetometer 114, a gyroscope 116, a barometer 118, a microphone 120 and a compass 122. The sensor block data block 105 may also interface with and receive data from external devices 124 connected via Bluetooth, USB cable, etc. Data collected from the sensors may be available to the mobile device 101.

The data processing block 130 may include for example, but not limited to, a first processor 132, a memory 134, and a first storage device 136. The data processing block 130 may perform operations on the data obtained from the sensor data block 105 including, but not limited to, subsampling, filtering, reformatting, etc.

The data transmission block 140 may include components providing transmission/reception of data from/to the mobile device 101, for example but not limited to, a wireless transceiver 142, a cellular transceiver 144, and/or a direct transmission interface 146 (e.g., a cable). The data transmission block 140 may communicate with an external computing device that may store and/or perform operations on the data obtained from sensor data block 105.

Some embodiments may be described using examples where vehicle movement data is collected using mobile devices (e.g., the mobile device 101). These examples are not limited to any particular mobile device. A variety of mobile devices may include sensors such as accelerometers 112, gyroscopes 116, compasses 119, barometers 113, etc., that can detect movement (also termed "movement sensors"). Location determination systems (also termed "location sensors") such as global positioning system (GPS) receivers 110 may also be included. Example mobile devices may include, but are not limited to, smart watches, fitness monitors, wireless headsets such as Bluetooth® headsets, tablets, laptop computers, smart phones, music players, movement analysis devices, and other suitable devices. One of ordinary skill in the art, given the description herein, would recognize many variations, modifications, and alternatives for the implementation of embodiments.

With many mobile devices 101, the sensors used to collect data are components of the mobile device 101, and use power resources available to mobile device 101 components, e.g., mobile device battery power and/or a data source external to mobile device 101.

Some embodiments may use settings of a mobile device to enable different functions described herein. For example, in operating systems such as Apple IOS™ and/or Android™ OS, having certain settings enabled can enable certain functions of embodiments. For some embodiments, having location services enabled allows the collection of location information from the mobile device (e.g., collected by global positioning system (GPS) sensors), and enabling background app refresh allows some embodiments to execute in the background, collecting and analyzing driving data even when the application is not executing.

The computer server 102 may communicate with the mobile device 101. In accordance with various aspects of the present disclosure, the server 102 may provide functionality using components including, but not limited to a second processor 150. The server 102 may also include a second data storage device 152. The second processor 150 may perform some or all of the processing of collected movement measurement data described below, and the second data storage device 152 may store the collected movement data, as well as the results of processing described herein.

To collect data associated with the movement of a vehicle, one or more sensors on the mobile device 101 (e.g., the sensors of the sensor data block 105) are operated close in time to a period when mobile device 101 is with the driver when operating a vehicle—also termed herein "a drive" or "a trip." Once the sensors of the mobile device 101 have collected data (i.e., historical data and/or real time data), some embodiments may analyze the data to determine movement measurements. As discussed below, some embodiments may analyze movement measurements (also termed herein "driving data") to detect events (also termed herein "driving events"). Analysis and processing of the collected data, as described herein, may occur on mobile device 101 and/or on server 102.

Figure 2:
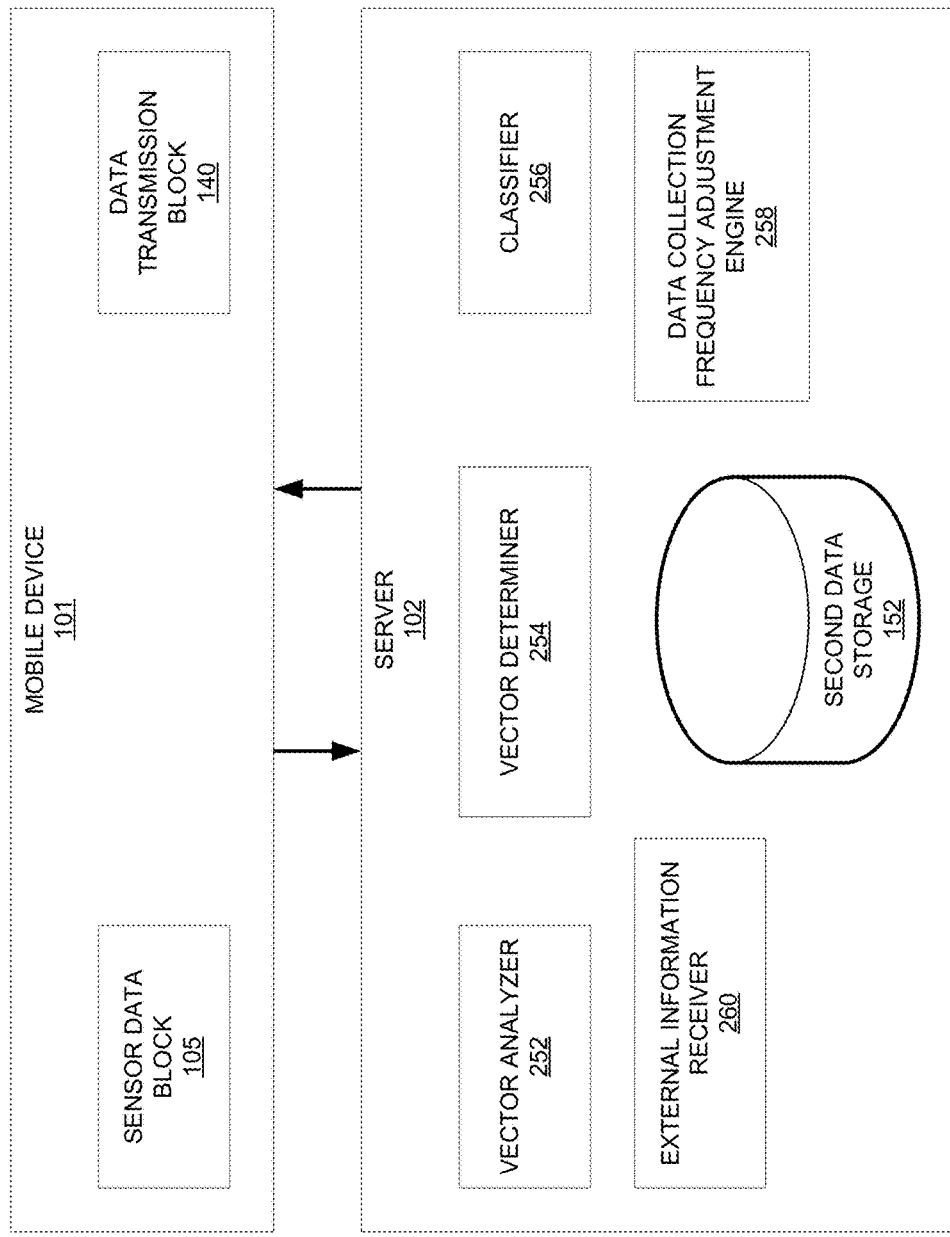
FIG. 2 is a block diagram illustrating additional details of the server 102 in accordance with various aspects of the present disclosure.

FIG. 2 is a block diagram 200 illustrating additional details of the server 102 in accordance with various aspects of the present disclosure. Referring to FIG. 2, the server 102 may include, for example, but not limited to, a vector analyzer 252, a vector determiner 254, a classifier 256, and a data collection frequency adjustment engine 258. The functions of these components may be executed by processors (e.g., the second processor 150) in conjunction with a memory, for example, but not limited to, internal memory of the second processor 150. The server 102 may also include an external information receiver 260. The external information receiver 260 may communicate with the mobile device 101. While not shown, one or more of the components illustrated as operating within server 102 may operate fully or partially within mobile device 101, and vice versa. For example, the vector analyzer 252, the vector determiner 254, the classifier 256, and the data collection frequency adjustment engine 258 may be implemented by one or more processors or other circuitry within the mobile device 101.

In accordance with various aspects of the present disclosure, a user brings the mobile device 101 (also referred to herein as a "device") into a vehicle. To collect data associated with the operation of the vehicle, the one or more sensors on the mobile device 101 (e.g., the sensors of the sensor data block 105) may be operated close in time to a period when the mobile device 101 is with the user when the vehicle is being operated—also termed herein "a drive" or "a trip". Once the mobile device sensors have collected data (historical and/or in real time), some embodiments analyze the data to determine acceleration vectors for the vehicle, as well as different features of the drive. Exemplary processes may classify driving features using the classifier 256, and determine acceleration vectors using the vector analyzer 252 and the vector determiner 254. In some embodiments, external data (e.g., weather) may be retrieved and correlated with collected driving data.

In accordance with various aspects of the present disclosure, collected sensor data (e.g., driving data collected using the sensor data block 105) may be used to analyze movement measurements and to detect the occurrence of driving events. Although shown and described as being contained within the server 102, it is contemplated that any or all of the components of server 201 may instead be implemented within the mobile device 101, and vice versa.

It is contemplated that any or all of the functionalities described herein may be performed during a drive, in real time, or after a drive. Examples of collecting driving data using sensors of a mobile device are described herein and in the Incorporated Applications. Examples of analyzing collected driving data to detect the occurrence of driving events are also described herein and in the Incorporated Applications.

Figure 3:
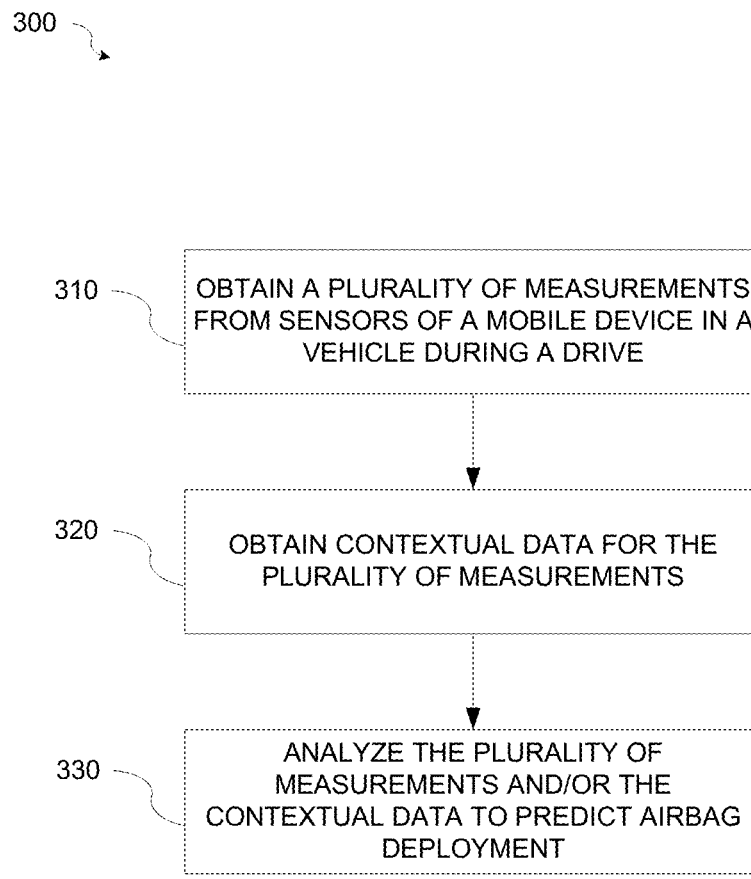
FIG. 3 is a flowchart illustrating an overview of a method for predicting vehicle airbag deployment according to various aspects of the present disclosure.

When a vehicle is involved in a crash, front and/or side airbags may deploy. In accordance with various aspects of the present disclosure, sensors (e.g., sensors in the sensor data block 105) and/or contextual information may be used to detect events consistent with a crash. FIG. 3 is a flowchart 300 illustrating an overview of a method for predicting vehicle airbag deployment according to various aspects of the present disclosure. At step 310, a plurality of measurements may be obtained from sensors of the mobile device 101 disposed within a vehicle during a drive. The sensors may include any or all of the sensors contained in the mobile device 101 (e.g., the sensor data block 105). In some embodiments, the measurements may include GPS measurements.

At step 320, contextual data for the plurality of measurements may be obtained. The contextual data may include, for example, but is not limited to, map information related to vehicle location, weather information, traffic information, etc. For example, the map information may indicate that the vehicle is on a highway, in a parking lot, etc.

At step 330, an airbag deployment prediction may be generated using at least one of the plurality of measurements and/or the contextual data. The airbag deployment prediction may also represent a likelihood that the vehicle was involved in an accident during the drive.

It should be appreciated that the specific steps illustrated in FIG. 3 provide a particular method for predicting vehicle airbag deployment according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
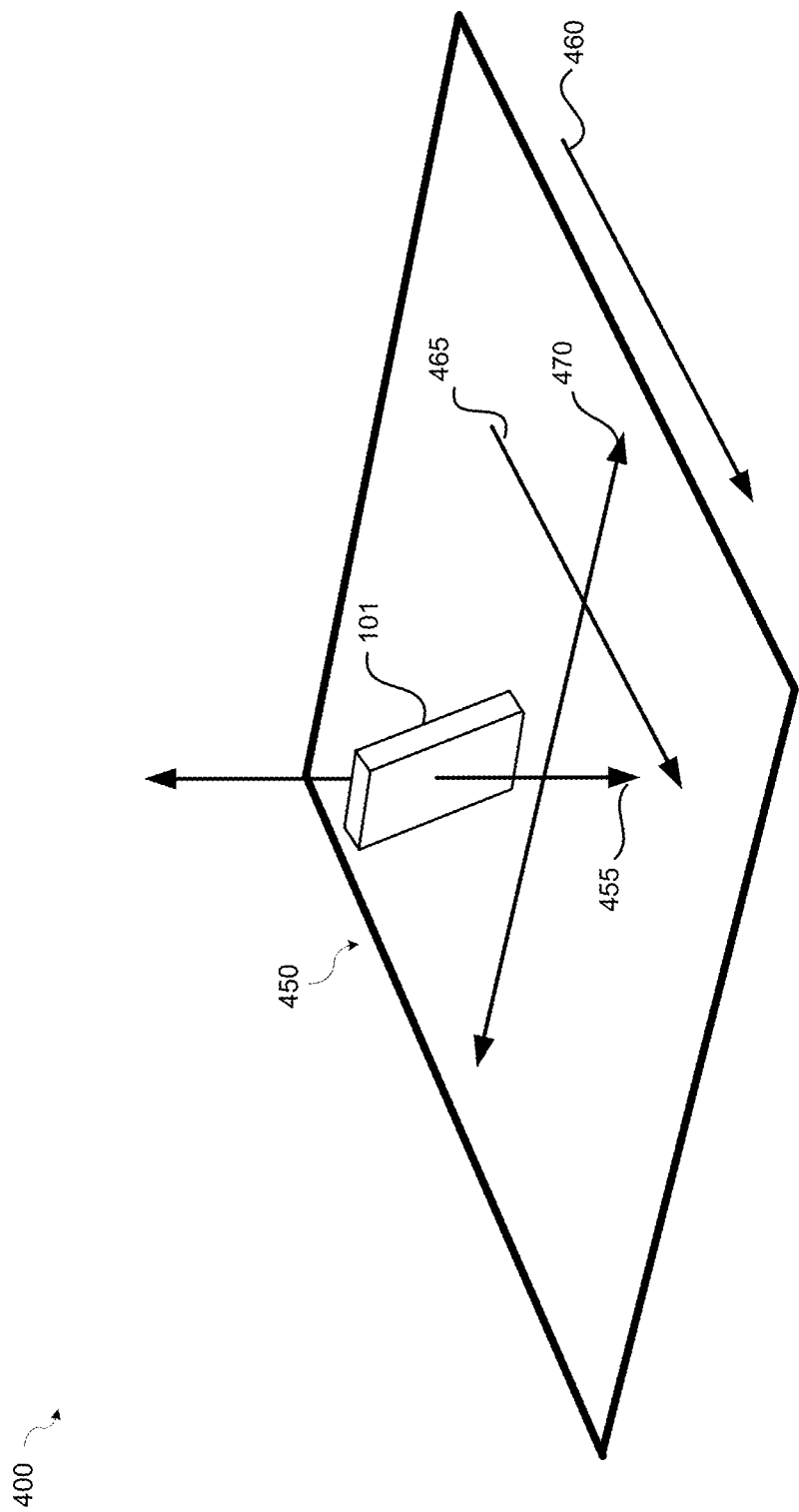
FIG. 4 is a diagram of the mobile device in a vehicle according to various aspects of the present disclosure.

FIG. 4 is a diagram 400 of the mobile device 101 in a vehicle 450 according to various aspects of the present disclosure. The mobile device 101 may provide movement measurements that enable detection of airbag deployment and assessment of vehicle accidents. In some embodiments, as described in the Incorporated Applications, by applying an extended Kalman filter movement data from the mobile device sensors (e.g., the sensors in the sensor data block 105), a gravity vector 455 for the mobile device 101 in the vehicle 450 moving in a direction 460 may be calculated.

Referring to FIG. 4, the vehicle 450 may be traveling in a direction of a vector 460, with forces measured by the mobile device 101 corresponding to the movement of the vehicle 450. The sensors of the mobile device 101 may measure a variety of different forces, for example, but not limited to, forward acceleration 465 and lateral acceleration 470.

The sensors (e.g., the sensors in the sensor data block 105) of the mobile device 101 may be used to detect accidents in a variety of ways. In accordance with various aspects of the present disclosure, the mobile device 101 may detect events that cause a spike in acceleration and/or deceleration measured using, for example, but not limited to, the accelerometer 112 or a derivative of GPS speed. As an example, for an accident, the accelerometer 112 output may be scanned as a function of time to determine time stamps for which spikes occur in the acceleration of the mobile device accelerometer 112 associated with speed decreases from above a threshold (e.g., 20 mph or another threshold) to a speed close to zero. After the sudden deceleration, the speed may remain near zero for an extended period of time, indicating that the car may be immobilized as a result of an accident.

Because the mobile device 101 is not fixed to the vehicle, the acceleration/deceleration patterns will be unique to the mobile device 101. As an example, in contrast with an accelerometer mounted in the vehicle, during an accident in which the mobile device 101 is lying on a seat, the deceleration for the mobile device 101 can lag the deceleration of the vehicle since the mobile device 101 may move from the seat to an interior surface of the vehicle (e.g., a door or the firewall) before coming to a stop. As a result, the timing of the acceleration patterns and their characteristics will be unique to the mobile device 101. Moreover, the orientation of the mobile device 101 may be used to map the accelerations measured using the mobile device 101 to the frame of reference of the vehicle. The reference frame of the mobile device 101 may be converted into the reference frame of the vehicle and then acceleration changes can be analyzed to detect an accident. The combination of the speed data and the accelerometer data may be utilized to filter out large accelerations/decelerations in which the vehicle speed does not change in a manner consistent with the large measured accelerations. An example may be hard braking that results in the phone sliding off the seat and crashing into the firewall, thereby generating a large acceleration, but the vehicle continues to move forward after the sudden stop.

Various sensors of the mobile device may be used to predict airbag deployment, which may in turn identify a crash event. In one example, a barometer or pressure sensor may be used to detect a change in pressure caused by airbag deployment. Herein, the term "barometer" should be understood to include a barometer as well as other sensors capable of sensing air pressure. A change in vehicle cabin air pressure may be detected by the barometer and an appropriate threshold value employed to determine an air pressure change indicating airbag deployment. For example, the barometer 118 of the mobile device 101 may indicate changes in cabin air pressure associated with a door of the vehicle being opened and/or closed. In accordance with various aspects of the present disclosure, the barometer 118 of the mobile device 101 may distinguish between minor changes in air pressure, for example by a door opening and closing, and an airbag deployment based on appropriately specified threshold values.

Figure 5:
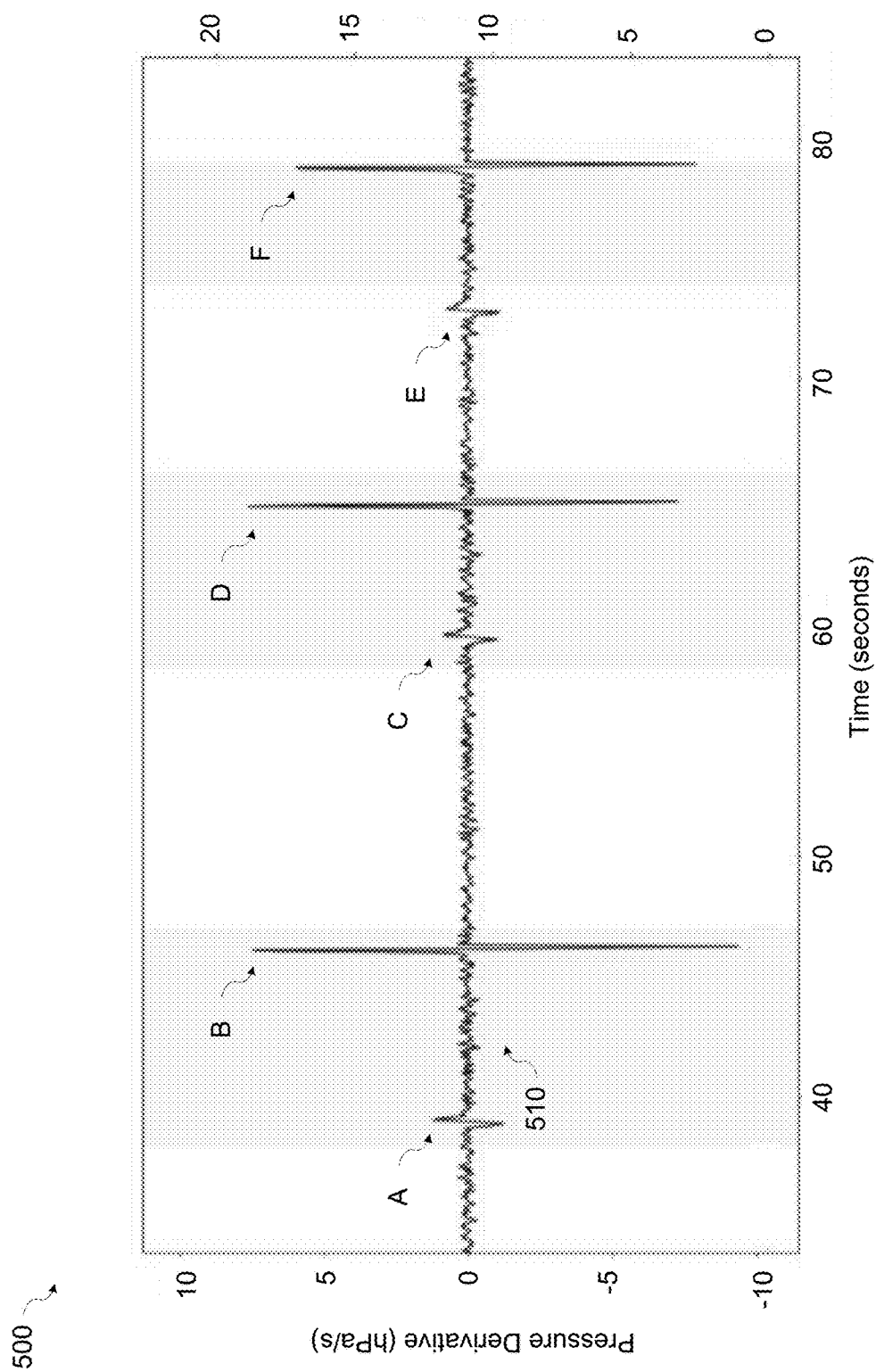
FIG. 5 is a graph illustrating a barometer signal resulting from a vehicle door opening and closing.

FIG. 5 is a graph illustrating a barometer signal resulting from a vehicle door opening and closing. Referring to FIG. 5, the barometer signal 510 (i.e., the pressure derivative)

registers a pressure change at point A (i.e., less than 5 hPa/s) indicating that a door was opened and another larger pressure change at point B (i.e., less than 10 hPa/s) indicating that the door was closed. Points C and E similarly indicate door openings while points D and F indicate door closings. One of ordinary skill in the art will appreciate that the illustrated door opening/closing pressure indications are exemplary and that other pressure values may indicate door openings/closings. Pressure derivative threshold values may be appropriately set to distinguish an accident event (e.g., airbag deployment) from door opening/closing events.

In accordance with various aspects of the present disclosure, a change in air pressure indicating airbag deployment may be detected by continuous monitoring of the pressure signal from the barometer 118 of the mobile device 101. The first processor 132 may monitor the pressure signal from the barometer 118 and calculate a derivative of the pressure signal. If the derivative of the pressure signal exceeds a specified threshold (e.g., 500 hPa/s or another threshold value), the first processor 132 may determine that the airbag deployed. Alternatively, first processor 132 may monitor the pressure signal from the barometer 118 without calculating its derivative and if the pressure signal exceeds a specified threshold, the first processor 132 may determine that the airbag deployed. Deployment of the airbag may be further interpreted by the first processor 132 as an indication that the vehicle was involved in an accident.

Figure 6:
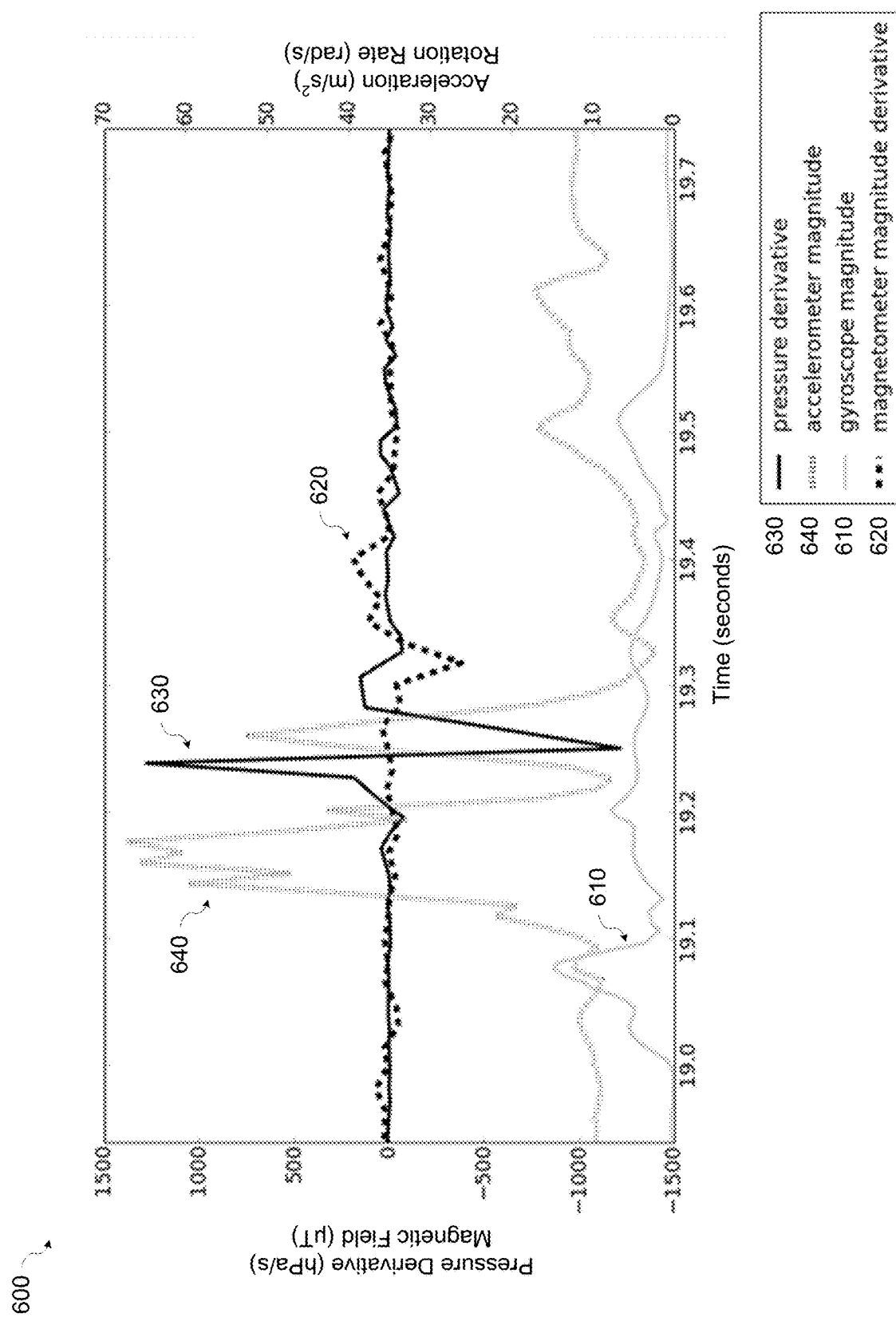
FIG. 6 is a graph illustrating various sensor signals during a crash event.

FIG. 6 is a graph 600 illustrating various sensor signals during a crash event. FIG. 6 shows a gyroscope magnitude signal 610, a magnetometer magnitude derivative signal 620, a pressure derivative signal 630, and an accelerometer magnitude signal 640 are illustrated. The signals may be obtained from the gyroscope 116, the magnetometer 114, the barometer 118, and the accelerometer 112, respectively, of the mobile device 101. Referring to FIG. 6, the gyroscope magnitude signal 610 indicates that the mobile device 101 may have started to bounce around within the vehicle followed by a peak in the accelerometer magnitude signal 640 at approximately 19.2 seconds, indicating that the mobile device 101 (and likely the vehicle) experienced a rapid deceleration. At approximately 19.25 seconds, the pressure derivative signal 630 indicates that the airbag may have deployed and deflated. Finally, the magnetometer magnitude derivative signal 620, indicates only minor changes in the orientation of the mobile device 101 (from magnetic north) until after airbag deployment.

In accordance with various aspects of the present disclosure, detection of an air pressure change indicating airbag deployment may be initiated by a signal from one or more of the sensors (e.g., accelerometer, gyroscope, magnetometer), one or more signals derived from a sensor signal (e.g., derivative or integration of the gyroscope signal, derivative of the gyroscope signal) or derived from GPS data (e.g., derivative of GPS speed data). The one or more signals or derived signals may exceed a threshold indicating an event leading to airbag deployment.

High frequency data collection (i.e., high sample rate) may be employed to capture the high frequency signal events. One of ordinary skill in the art will appreciate that the sample rate may be based at least in part on the characteristics of the sensor of interest. One of ordinary skill in the art will appreciate that these signals and derived signals are exemplary and that other signals and derived signals may be used to initiate detection of a pressure change indicating airbag deployment without departing from the scope of the present disclosure. Herein, the term "sensor signal" may be used to mean both a sensor signal and a signal derived from either a sensor signal or GPS data.

Figure 7:
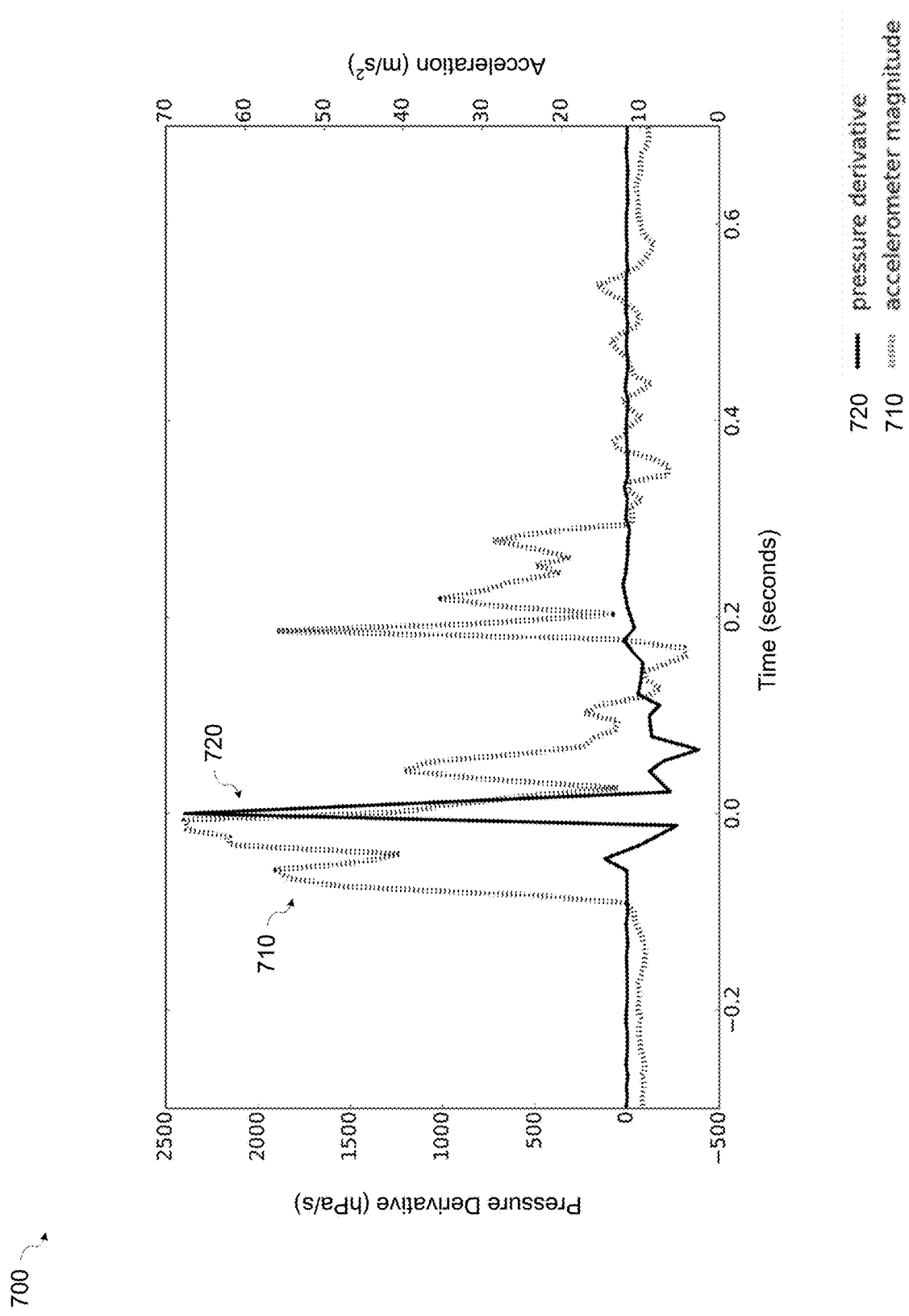
FIG. 7 is a graph illustrating an accelerometer magnitude signal and a pressure derivative signal.

FIG. 7 is a graph 700 illustrating an accelerometer magnitude signal 710 and a pressure derivative signal 720. The accelerometer magnitude signal 710 and may be generated by the accelerometer 112 in the mobile device 101 or maybe derived from GPS data. The pressure derivative signal 720 may be derived from the signal from the barometer 118 or other pressure sensor in the mobile device 101. FIG. 7 shows a sharp spike in the pressure derivative signal 720 exceeding a threshold, for example 500 hPa/s. The sharp spike in the pressure derivative signal 720 may indicate deployment of the airbag. Prior to the spike in the pressure derivative signal 720, the accelerometer magnitude signal 710 also shows a spike exceeding a threshold, for example 30 m/s$^2$. One of ordinary skill in the art will appreciate that these signal threshold values are merely exemplary and that other threshold values may be used without departing from the scope of the present disclosure.

The spike in the accelerometer magnitude signal 710 may indicate a rapid deceleration of the mobile device 101, which may also indicate an event causing a rapid deceleration of the vehicle, prior to the spike in the pressure derivative signal 720. The detection of the combination of the rapid changes in the accelerometer magnitude signal 710 and the pressure derivative signal 720 may predict airbag deployment indicating that the vehicle was involved in a crash.

Figure 8:
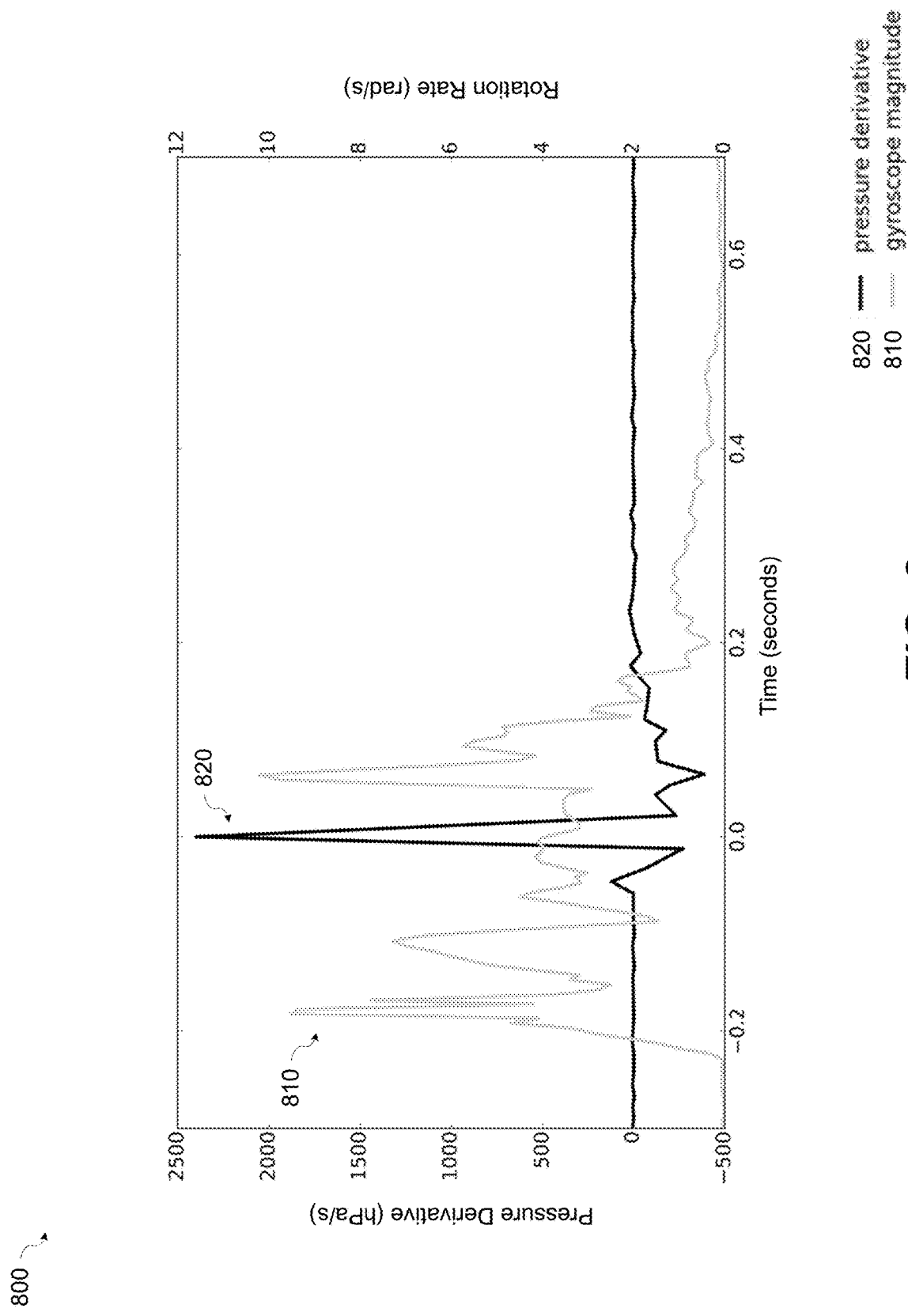
FIG. 8 is a graph illustrating an gyroscope magnitude signal and a pressure derivative signal.

FIG. 8 is a graph 800 illustrating an gyroscope magnitude signal 810 and a pressure derivative signal 820. The gyroscope magnitude signal 810 and may be generated by the gyroscope 116 in the mobile device 101. The pressure derivative signal 820 may be derived from the signal from the barometer 118 or other pressure sensor in the mobile device 101. FIG. 8 shows a sharp spike in the pressure derivative signal 820 exceeding a threshold, for example 500 hPa/s, indicating deployment of the airbag. Prior to the spike in the pressure derivative signal 820, the gyroscope magnitude signal 810 also shows a spike exceeding a threshold, for example 4 rad/s. One of ordinary skill in the art will appreciate that these signal threshold values are merely exemplary and that other threshold values may be used without departing from the scope of the present disclosure.

In FIG. 8, the gyroscope magnitude signal 810 shows multiple spikes both before and after the spike in the pressure derivative signal 820. The multiple spikes in the gyroscope magnitude signal 810 may indicate a rapid tumbling motion of the mobile device 101 both before and after the spike in the pressure derivative signal 820 which may also indicate an event causing a rapid deceleration and/or sudden stop of the vehicle, prior to the spike in the pressure derivative signal 820. The detection of the combination of the rapid changes in the gyroscope magnitude signal 810 and the pressure derivative signal 820 may predict airbag deployment indicating that the vehicle was involved in a crash.

Figure 9:
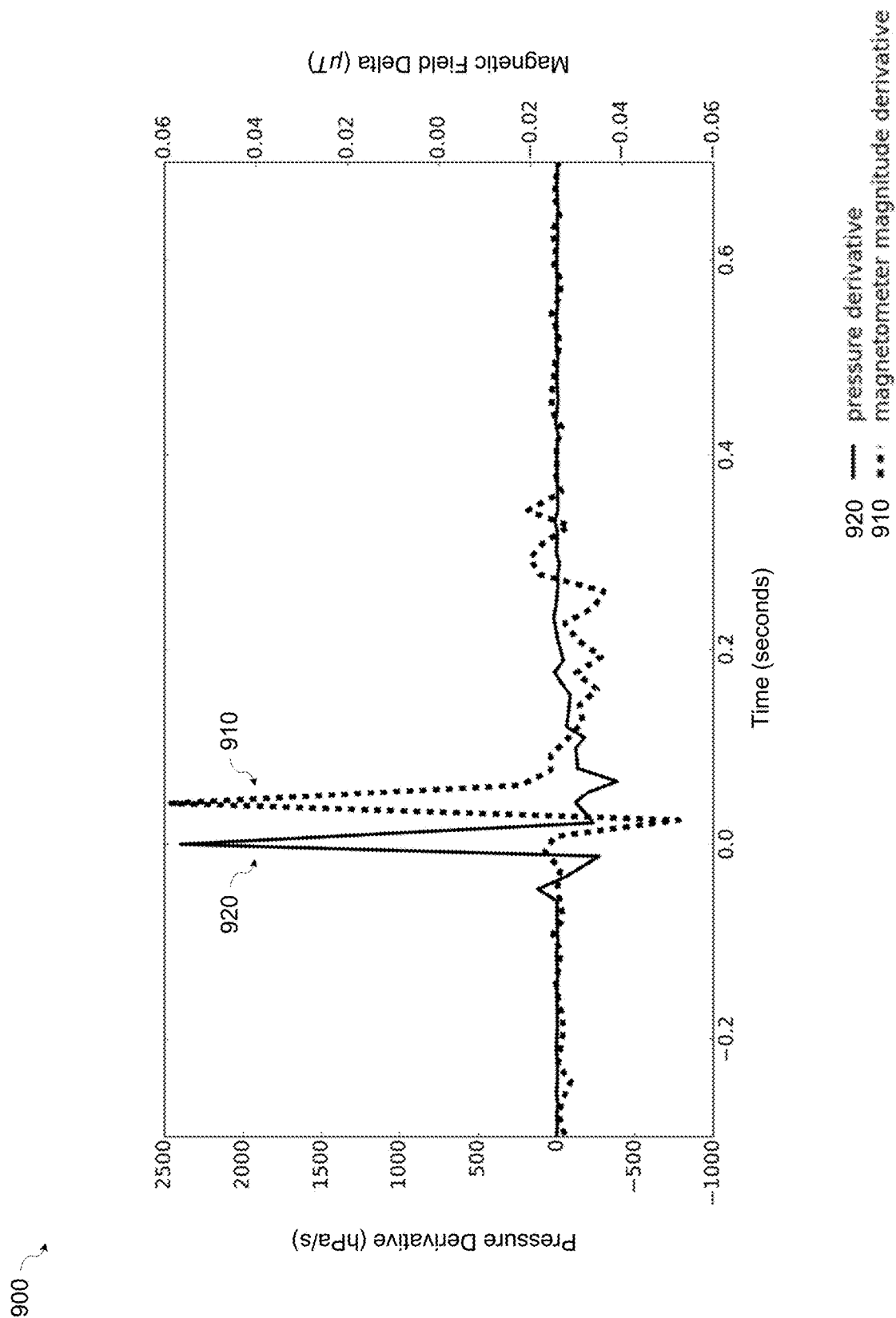
FIG. 9 is a graph illustrating a magnetometer magnitude derivative signal and a pressure derivative signal.

FIG. 9 is a graph 900 illustrating a magnetometer magnitude derivative signal 910 and a pressure derivative signal 920. The magnetometer magnitude derivative signal 910 and may be generated by the magnetometer 114 in the mobile device 101 or maybe derived from GPS data. The pressure derivative signal 920 may be derived from the signal from the barometer 118 or other pressure sensor in the mobile device 101. FIG. 9 shows a sharp spike in the pressure derivative signal 920 exceeding a threshold, for example 500 hPa/s. Subsequent to the spike in the pressure derivative signal 920, the magnetometer magnitude derivative signal 910 also shows a sharp spike exceeding a threshold, for example 0.02 µT. One of ordinary skill in the art will appreciate that these signal threshold values are merely exemplary and that other threshold values may be used without departing from the scope of the present disclosure.

In FIG. 9, the magnetometer magnitude derivative signal 910 shows multiple spikes both after the spike in the pressure derivative signal 920. The multiple spikes in the magnetometer magnitude derivative signal 910 may indicate a rapid change in orientation of the mobile device 101 after the spike in the pressure derivative signal 920 which may also indicate an event causing a sudden turning or spinning of the mobile device 101 and possibly the vehicle subsequent to the spike in the pressure derivative signal 920. In some cases, the magnetometer magnitude derivative signal 910 may register spikes before and/or after the spike in the pressure derivative signal 920 depending on the nature of the event. The detection of the combination of the rapid changes in the magnetometer magnitude derivative signal 910 and the pressure derivative signal 920 may predict airbag deployment indicating that the vehicle was involved in a crash.

In accordance with various aspects of the present disclosure, a pressure change that may predict airbag deployment may be determined using a sliding window. The sliding window may be triggered by trigger window. One of ordinary skill in the art will appreciate that any one of the sensor signals or their derivatives or any combination of the sensor signals or their derivatives may initiate operations for monitoring air pressure changes to predict airbag deployment without departing from the scope of the present disclosure.

Figure 10:
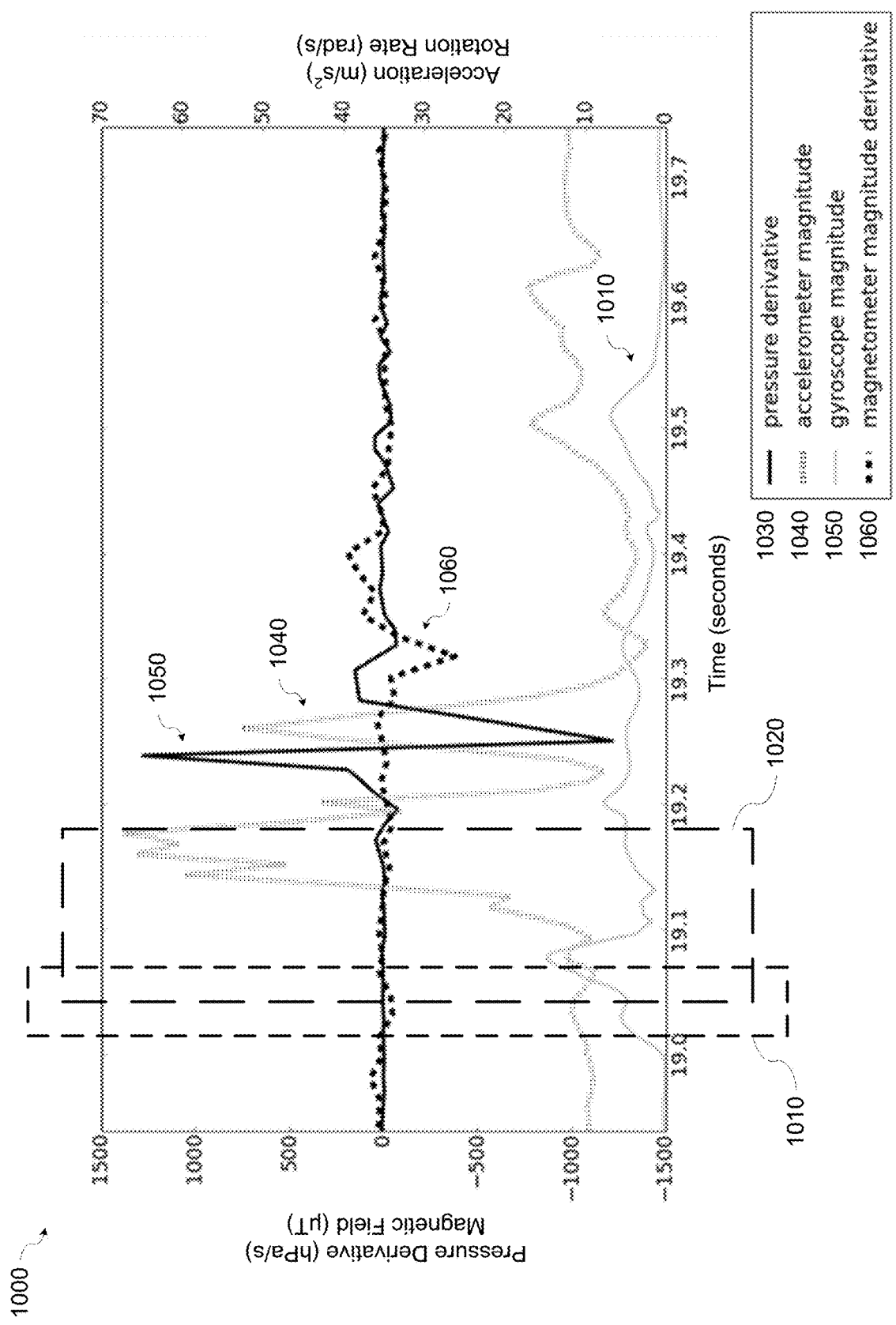
FIG. 10 is a graph illustrating a sliding window and a trigger window in accordance with various aspects of the present disclosure.

FIG. 10 is a graph illustrating a sliding window and a trigger window in accordance with various aspects of the present disclosure. Referring to FIG. 10, for example, the first processor 132 may monitor the one or more sensor signals or the derivatives of the sensor signals within a first time window 1010, for example a window of 0.01 seconds or a larger window. The first processor 132 may calculate a derivative of a signal (e.g., the accelerometer signal or another signal) between data points at the leading and trailing edges of the window as well as between successive data points within the window as the window moves along the signal in time, for example in time increments less than the width of the window or another time increment. If the signal difference within the window exceeds a specified threshold, the first processor 132 may trigger a second time window 1020 to evaluate the pressure signal.

Figure 11:
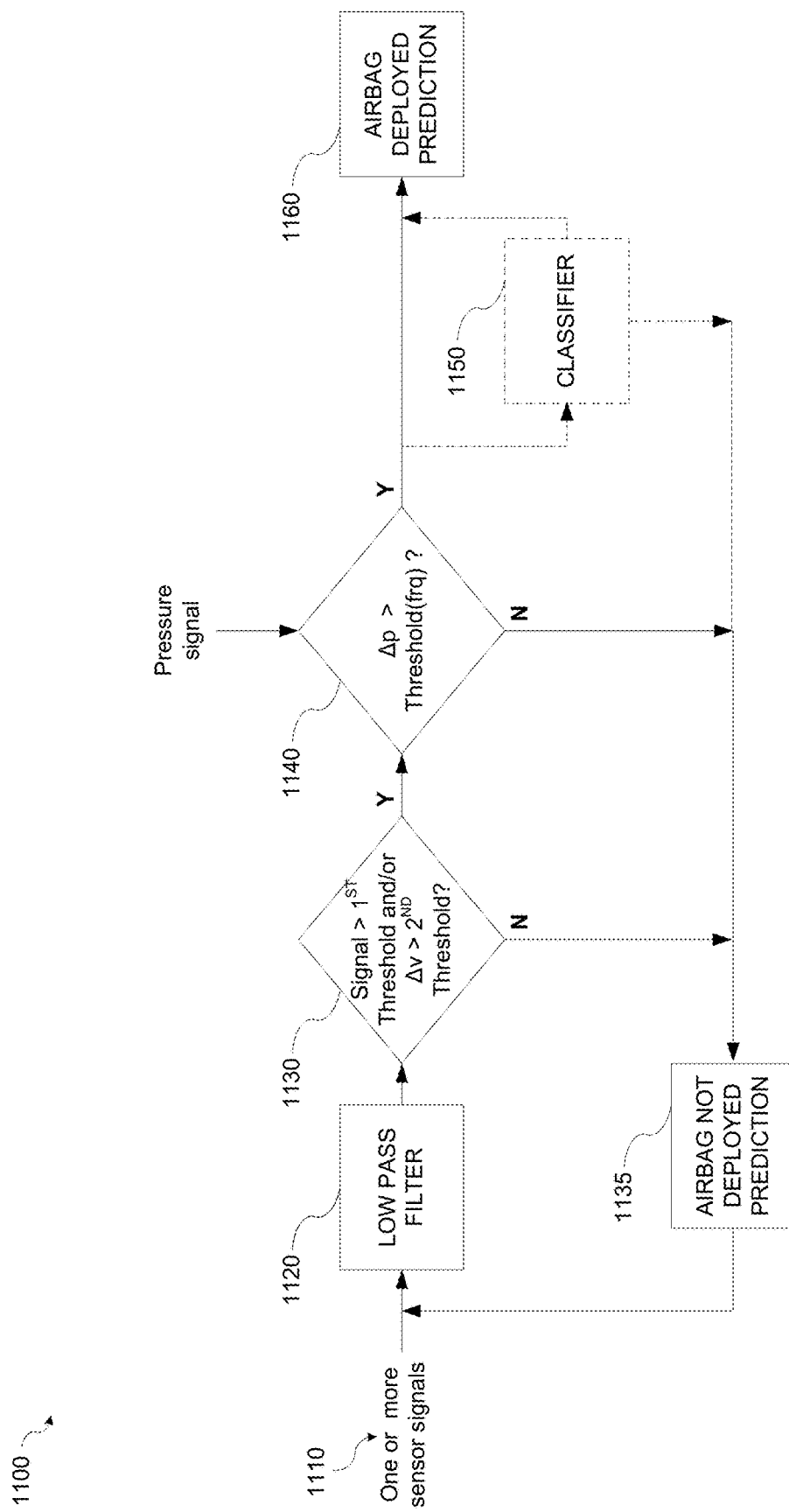
FIG. 11 is a block diagram of a process 1100 for predicting airbag deployment in accordance with various aspects of the present disclosure.

In accordance with various aspects of the present disclosure, a classifier may be used to predict airbag deployment. FIG. 11 is a block diagram of a process 1100 for predicting airbag deployment in accordance with various aspects of the present disclosure. Referring to FIG. 11, at operation 1110 one or more sensor signals or signals derived from the sensor signals may be monitored. At operation 1120, the one or more sensor signals or signals derived from the sensor signals may be low pass filtered. At operation 1130, the filtered signals may be compared to thresholds. For example, the magnitude "v" of a filtered signals may be compared to specified first threshold according to the type of signal (e.g., accelerometer signal, gyroscope signal, etc.).

Alternatively or additionally, the derivative Δv of the value "v" of a monitored signal of the mobile device 101 may be compared to a specified second threshold. If the signals have been determined to not exceed the specified thresholds (operation 1130-N), at operation 1135, the process predicts that the airbag has not been deployed and returns to monitoring the signals.

If the signals have been determined to exceed the specified thresholds (operation 1130-Y), at operation 1140, a pressure signal may be received, for example a barometer signal. A difference in a pressure derivative signal may be derived from the pressure signal and compared to a specified threshold. The threshold of the pressure derivative signal may be a function of the sampling frequency. Threshold values for Δp from previously obtained field collision data corresponding to different sampling frequencies may be collected and fitted into a regression function (e.g., a linear regression function, a quadratic regression function, etc.). Thus, given any sampling frequency, a specific Δp threshold corresponding to that frequency may be determined. The pressure derivative signal for a given frequency may be calculated as:

$$\Delta p = \max(\text{pressure}(t) - \text{pressure}(t-1)) \text{ over 2 seconds or another time period after } \Delta v > \text{threshold}.$$

If none of the signals exceeds a specified threshold (operation 1140-Y), at operation 1135, the process predicts that the airbag has not been deployed and returns to monitoring the signals. If Δp exceeds the specified threshold (operation 1140-Y), at operation 1160 the process may predict that the airbag has been deployed. If it is determined that the airbag has deployed, a signal may be transmitted an emergency services provider or to a monitoring location and emergency services deployed or an attempt made to contact the driver.

In accordance with various aspects of the present disclosure, a classifier may optionally be included in the process 1100 for predicting airbag deployment. If the pressure derivative signal has been determined to exceed the specified threshold, at optional operation 1150, information regarding the pressure derivative signal as well as the one or more other signals that have been determined to exceed their thresholds, are input to the classifier. The classifier may be previously trained using test data and may provide an airbag deployment prediction based on the signal information input to the classifier. The classifier may take in features with examples of a positive class (e.g., airbag deployments) and a negative class (e.g., airbag non-deployments) and calculate a boundary or decision tree to separate the data. The classifier may include features for example, but not limited to:

The peak acceleration and acceleration change from GPS and/or accelerometer due to an impact;

The rotation rate of the mobile device to sense vibrations from impact; and/or

The pressure and pressure change from barometer readings due to airbag deployments Each of the features may be calculated as rolling average over some time or may be calculated in some other way.

If the classifier predicts that the airbag has not deployed (operation 1135), the process returns to monitoring the signals. At operation 1160, if the classifier predicts that the airbag has deployed, the process ends. If it is determined that the airbag has deployed, a signal may be transmitted an emergency services provider or to a monitoring location and emergency services deployed or an attempt made to contact the driver.

It should be appreciated that the specific steps illustrated in FIG. 11 provide a particular process for predicting vehicle airbag deployment according to an embodiment of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

In another example, a microphone may be used to detect airbag deployment and/or the distinctive metal-on-metal sound cause by an accident. In still another example, a GPS device may be used to confirm that the vehicle is not moving after a detected accident (e.g., the vehicle has pulled over to the side of the road, the vehicle has become disabled, etc.).

Upon detection of airbag deployment indicative of an accident, various follow-up steps may be taken according to some embodiments. For example, various embodiments may provide for automatic contacting of first responders, tow trucks, emergency contacts, etc. In another example, relevant information may be pushed to the mobile device for display to the driver. Such relevant information may include common preventative measures for whiplash, if it is detected that a rear collision occurred at a certain intensity.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the various embodiments are not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

The examples and embodiments described herein are for illustrative purposes only. Various modifications or changes in light thereof will be apparent to persons skilled in the art. These are to be included within the spirit and purview of this application, and the scope of any included claims.

What is claimed is:

1. A method for detecting airbag deployment using a mobile device, the method comprising:

operating a plurality of sensors of the mobile device disposed in a vehicle during a drive to obtain a plurality of motion measurement signals;

determining, by a processor of the mobile device, a change in at least one motion measurement signal of the plurality of motion measurement signals;

determining, by the processor of the mobile device, that the change in the at least one motion measurement signal exceeds a first threshold;

in response to determining that the change in the at least one motion measurement signal exceeds the first threshold, obtaining a pressure measurement signal from a pressure sensor of the plurality of sensors of the mobile device;

determining, by the processor of the mobile device, a rate of change of the pressure measurement signal;

determining, by the processor of the mobile device, that the rate of change of the pressure measurement signal exceeds a second threshold;

in response to determining that the rate of change of the pressure measurement signal exceeds the second threshold, detecting a deployment of a vehicle airbag based on the change in the at least one motion measurement signal exceeding the first threshold and the rate of change of the pressure measurement signal exceeding the second threshold; and based on detecting that the vehicle airbag is deployed:
determining that a vehicle crash event occurred, and
transmitting a signal to at least one of the mobile device or a computer of a service provider to output an indication of the vehicle crash event.

2. The method of claim 1, wherein the plurality of sensors comprises a barometer, an accelerometer, a gyroscope, and a magnetometer.

3. The method of claim 2, wherein the at least one motion measurement signal is generated by the accelerometer.

4. The method of claim 2, wherein the at least one motion measurement signal is generated by the gyroscope.

5. The method of claim 2, wherein the at least one motion measurement signal is generated by the magnetometer.

6. The method of claim 2, wherein the at least one motion measurement signal is generated by any combination of the accelerometer, the gyroscope, and the magnetometer.

7. The method of claim 1, wherein the at least one motion measurement signal is a rate of change of a motion measurement signal from a gyroscope or a magnetometer of the mobile device.

8. The method of claim 1, wherein the at least one motion measurement signal is a rate of change of a global positioning system (GPS) speed signal received by the mobile device.

9. The method of claim 1 wherein determining the rate of change of the pressure measurement signal comprises:
obtaining a plurality of air pressure measurement signals measuring an air pressure inside the vehicle from a barometer of the mobile device; and
determining a change in the air pressure inside the vehicle over time based on the plurality of motion measurement signals generated by the barometer.

10. The method of claim 1 wherein the second threshold is based on a sampling frequency of the pressure measurement signal.

11. The method of claim 10, wherein the second threshold is based on a regression function that relates between a set of second thresholds and a set of sampling frequencies; and wherein the regression function is generated based on pressure measurement signals collected from past vehicle crash events.

12. The method of claim 1, wherein detecting the deployment of the vehicle airbag comprises inputting information representing the pressure measurement signal and the at least one motion measurement signal to a trained classifier to detect whether the vehicle airbag is deployed.

13. The method of claim 12, wherein the trained classifier is trained to extract, from the information representing the pressure measurement signal and the at least one motion measurement signal, features comprising at least one of: a peak acceleration and acceleration changes of the vehicle due to an impact, a rotation rate of the mobile device to sense vibrations from the impact, or a pressure and pressure changes based on the pressure measurement signal from the pressure sensor due to a deployment of the vehicle airbag; and wherein the trained classifier is trained to detect whether the vehicle airbag is deployed based on the features.

14. A mobile device configured to detect airbag deployment, the mobile device comprising:
a plurality of sensors;
a memory configured to store instructions; and
a processor configured to communicate with the plurality of sensors and the memory, the processor further configured to execute the instructions stored in the memory, the instructions operable to cause the processor to:
operate the plurality of sensors of the mobile device disposed in a vehicle during a drive to obtain a plurality of motion measurement signals;
determine a change in at least one motion measurement signal of the plurality of motion measurement signals;
determine that the change in the at least one motion measurement signal exceeds a first threshold;
in response to determining that the change in the at least one motion measurement signal exceeds the first threshold, obtain a pressure measurement signal from a pressure sensor of the plurality of sensors;
determine a rate of change of the pressure measurement signal;
determine that rate of change of the pressure measurement signal exceeds a second threshold;
in response to determining that the rate of change of the pressure measurement signal exceeds the second threshold, detect a deployment of a vehicle airbag based on the change in the at least one motion measurement signal exceeding the first threshold and the rate of change of the pressure measurement signal exceeding the second threshold; and
based on detecting that the vehicle airbag is deployed:
determine that a vehicle crash event occurred, and
transmit a signal to at least one of the mobile device or a computer of a service provider to output an indication of the vehicle crash event.

15. The mobile device of claim 14, wherein the plurality of sensors comprises a barometer, an accelerometer, a gyroscope, and a magnetometer.

16. The mobile device of claim 15, wherein the at least one motion measurement signal is generated by the accelerometer.

17. The mobile device of claim 15, wherein the at least one motion measurement signal is generated by any combination of the accelerometer, the gyroscope, and the magnetometer.

18. The mobile device of claim 14, wherein the at least one motion measurement signal is a rate of change of a motion measurement signal from a gyroscope or a magnetometer of the mobile device.

19. The mobile device of claim 14, wherein the at least one motion measurement signal is a rate of change of a global positioning system (GPS) speed signal received by the mobile device.

20. The mobile device of claim 14 wherein the processor is further configured to execute instructions operable to cause the processor to determine the rate of change of the pressure measurement signal by:
   obtaining a plurality of air pressure measurement signals measuring an air pressure inside the vehicle from a barometer of the mobile device; and
   determining a change in the air pressure inside the vehicle over time based on the plurality of air pressure measurement signals generated by the barometer.

* * * * *